US006944753B2

(12) United States Patent
Busaba et al.

(10) Patent No.: US 6,944,753 B2
(45) Date of Patent: Sep. 13, 2005

(54) FIXED POINT UNIT PIPELINE ALLOWING PARTIAL INSTRUCTION EXECUTION DURING THE INSTRUCTION DISPATCH CYCLE

(75) Inventors: Fadi Y. Busaba, Poughkeepsie, NY (US); Christopher A. Krygowski, Lagrangeville, NY (US); Wen H. Li, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 09/832,544

(22) Filed: Apr. 11, 2001

(65) Prior Publication Data

US 2002/0174324 A1 Nov. 21, 2002

(51) Int. Cl.[7] ................................. G06F 7/00
(52) U.S. Cl. ........................ 712/224; 712/221
(58) Field of Search ............... 712/218, 221, 712/224, 300

(56) References Cited

U.S. PATENT DOCUMENTS

| | | | | |
|---|---|---|---|---|
| 4,750,112 A | * | 6/1988 | Jones et al. ................ 712/217 |
| 5,526,500 A | * | 6/1996 | Tanksalvala et al. ........ 712/218 |
| 5,542,059 A | * | 7/1996 | Blomgren .................... 712/41 |
| 5,651,121 A | * | 7/1997 | Davies ........................ 712/200 |
| 5,717,882 A | * | 2/1998 | Abramson et al. .......... 712/217 |
| 5,935,239 A | * | 8/1999 | Narayan ...................... 712/224 |
| 5,948,098 A | * | 9/1999 | Leung et al. ................ 712/221 |

* cited by examiner

Primary Examiner—Eddie Chan
Assistant Examiner—Aimee J. Li
(74) Attorney, Agent, or Firm—Lynn L. Augspurger

(57) ABSTRACT

A method for allowing a partial instruction to be executed in a fixed point unit pipeline during the instruction dispatch cycle creates a mask used to select which bits of the operands participate in a future logical operation of the fixed point unit back a cycle to the instruction dispatch stage of the fixed point unit. As an S/390 System improvement applicable to other computers, the mask is determined and created two cycles ahead of execution, or two cycles before the mask is actually used. Also, in the method used for moving the mask generation back by one cycle, mask generation overlaps the dispatch stage in the I-unit, and this provides a handshake between the I-unit and E-unit of the fixed point unit of the central processor unit of the computer system. The control setting selection process occurs in a predetermination cycle stage or e-1 (em1) stage for the mask generation and the register file read address. Speculative handshaking allows the E-1 stage to be created with no impact to the last stage of the I-Unit, such that no additional logic is needed and cycle time is not jeopardized. Also, the E-1 stage of an instruction overlaps with the execution stages of previous instructions.

15 Claims, 1 Drawing Sheet

FIXED POINT UNIT PIPELINE ALLOWING PARTIAL INSTRUCTION EXECUTION DURING THE INSTRUCTION DISPATCH CYCLE

FIELD OF THE INVENTION

This invention relates to computers, and particularly to a method for allowing a partial instruction to be executed in a fixed point unit pipeline during the instruction dispatch cycle.

Trademarks: S/390 and IBM are registered trademarks of International Business Machines Corporation, Armonk, N.Y., U.S.A. Other names may be registered trademarks or product names of International Business Machines Corporation or other companies.

BACKGROUND

The invention relates to computers and representative of the computers which can implement the invention has been the IBM S/390 system, but it could be another system. Such a system would have a Fixed Point Unit for the computer, or FXU, which acts as the integer execution unit of the Central Processor (CP) unit of the computer system, be it an IBM S/390 system, or that of other systems. The Fixed Point Unit (FXU) contains an Arithmetic and Logical Unit (ALU) which is capable of performing arithmetic functions such as binary addition, subtraction, as well as logical operations such as logical and, logical or, and logical exclusive or. These logical operations are bit maskable which means that a mask is used to select which bits of the operands participate in the logical operation. The unselected bits of the result are left unchanged. This mask is either explicitly specified in the instruction text as the location of the beginning and ending bit positions of a contiguous mask or the instruction may implicitly require a mask. The mask is also used for a variety of other instructions including shift operations and stores. The execution of the logical operation is serially gated by the construction of the mask. We found that it was not possible to reduce the processor cycle time without increasing the number of cycles required to perform the bit maskable operations until we discovered our improved method described below.

SUMMARY OF THE INVENTION

In accordance with our invention, a method for allowing a partial instruction to be executed in a fixed point unit pipeline during the instruction dispatch cycle creates a mask used to select which bits of the operands participate in a future logical operation of the fixed point unit back a cycle to the instruction dispatch stage of the fixed point unit. In such a case, for an S/390 System improvement, the mask is determined and created two cycles ahead of execution, or two cycles before the mask is actually used. Also, in the method used for moving the mask generation back by one cycle, mask generation overlaps the dispatch stage in the I-unit, and we define thus a new handshake between the I-unit and E-unit of the fixed point unit of the central processor unit of the computer system.

These and other improvements are set forth in the following detailed description. For a better understanding of the invention with advantages and features, refer to the description and to the drawings.

Our detailed description explains the preferred embodiments of our invention, together with advantages and features, by way of example with reference to the drawings.

DETAILED DESCRIPTION OF THE INVENTION

Figure 1:
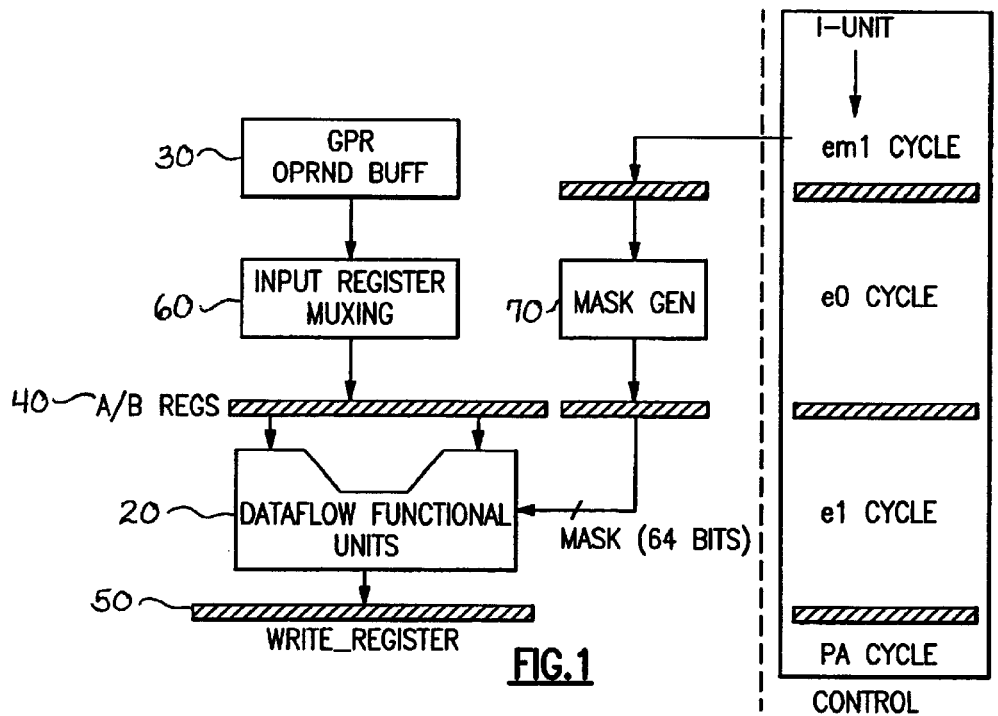
FIG. 1 illustrates the Fixed Point Unit data flow and timing unit flow for the mask generator.

It will be seen from FIG. 1 which illustrates our preferred embodiment the integer execution unit of the central processor unit (here the Fixed Point Unit—FXU which we provide in our preferred embodiment) has a control and data pipeline. The control pipeline is divided into four stages for instruction execution. These four stages shown in FIG. 1 are an e-1 (em1) stage and e0 stage, and e1 stage and a putaway (pa) stage. The dataflow comprises a register array 30, an input register 40, the arithmetic logic unit (ALU) 20, input register multiplexers 60 for muxing the different values of the operands into the working registers, mask generation logic 70 for generating the operand masks, and the write register 50. These stages are connected in an ordered manner such that the processing of instructions occurs in the dataflow pipeline which receives the data and control input and performs integer instruction execution.

During the em1 stage an instruction is presented to the control stack of the integer execution unit fixed point unit FXU. This instruction is not validated during this stage. At this stage is not determined if the instruction is an instruction whose execution should complete. During the e0 stage, the register file is accessed to acquire the operands required for computation. During the e0 state the fixed point unit FXU is informed that the instruction that was presented to the em1 stage was indeed valid and requires computation. During the e1 stage the ALU 20 is used to perform the required computation. The ALU is capable of performing arithmetic functions such as binary addition, subtraction, as well as logical operations such as Logical AND, Logical OR and Logical exclusive or (XOR). These logical operations are bit maskable. A mask is used to select which bits of the operands participate in the logical operation in a bit maskable logical operation. The unselected bits of the result are left unchanged in this operation. This mask is either explicitly specified in the instruction text as the location of the beginning and ending bits positions of a contiguous mask of the instruction may implicitly require a mask. The resultant data is outputted from the pipeline along with controls on the put away (pa) cycle through the write register 50. The control and data output is used to update architectural information.

It will be noted that in our operations, the control pipeline for FXU instructions is divided up into three pipeline stages, the E0, the E1, and the PA stages. The E0 is the stage when the instruction is being decoded to determine what instruction it is in order to setup the controls to the ALU. During this cycle the operands are read and loaded into the FXU input registers. The E1 stage is the first cycle of execution where the input operands feed the ALU and the result is put into the result register. The final stage is the PA cycle where the contents of the result register are sent to the architected General Purpose Register file, GPR. These three pipeline stages can work independently so that they can contain three different instructions in various states of execution.

In addition to the three pipeline stages we provide what we call an e-1 (em1) "stage" which overlaps with the I-unit dispatch stage and this e-1 stage sets the controls for the mask generation and for the general purpose registers (gprs) read addresses. In the handshaking, this arrangement allows the commencement of execution even though it has not been finally determined that the instruction is one whose execution should complete. It might be kept, thrown away or otherwise handled at this "stage". During e0 stage we receive confirmation that what was sent in the previous cycle contains valid information for an instruction whose execution should completed.

Thus, in order to allow the processor cycle time to be reduced, the mask generation process was divided into two processes and partitioned among two pipeline stages. A new FXU pipeline stage was created to accommodate the first part of the mask generate process. This stage is called the E-1 stage and it is inserted before the E0 stage. The addition of this pipeline stage did not increase the depth of the FXU pipeline. This E-1 stage overlaps with the last stage or dispatch stage of the Instruction Decode and Dispatch Unit, I-Unit. During the E-1 stage this instruction is physically in transit from the I-Unit to the FXU. The instruction text is then examined by the first mask generation process to see if the mask starting and ending bit position are explicitly defined in the instruction text. If not, the instruction is decoded to calculate the implied mask starting and ending bit position. This mask information is latched into registers at the end of the E-1 stage. It will then be used by the following E0 stage on the next cycle. In the E0 stage, the entire 64 bit mask is created using the mask start and end bit positions. This 64 bit mask is latched in a register at the end of the E0 stage. It will then be used by the ALU in the E1 stage.

Figure 2:
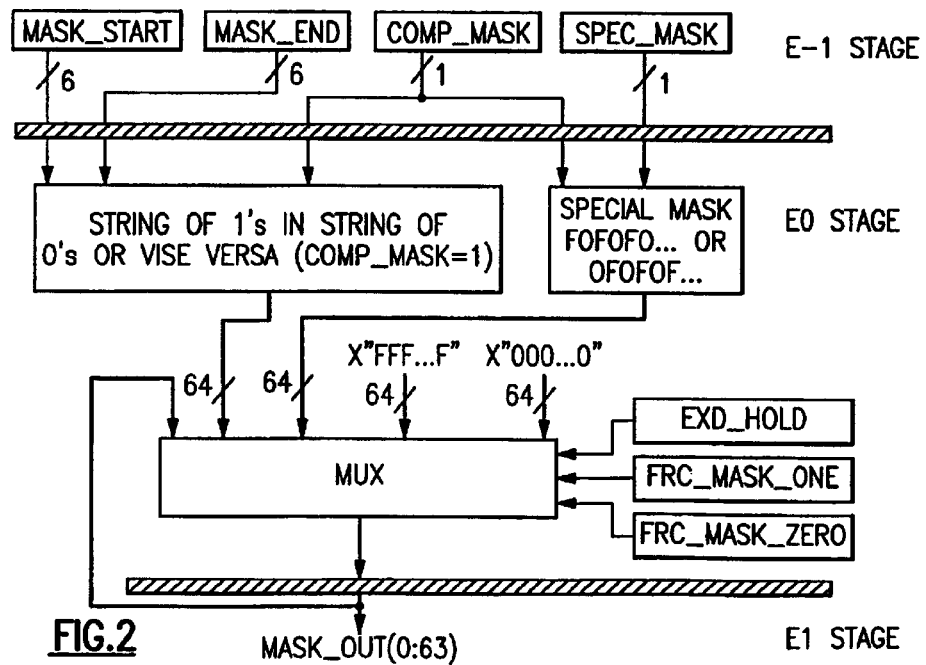
FIG. 2 illustrates the control setting selection process that occurs in the e-1 (em1) stage for the mask generation and the register file read address.

As FIG. 1. shows a timing flow of the mask gen (generating) logic, while FIG. 2 shows a more detailed description of the mask generator logic, these Figures show how during the E-1 stage(em1 stage), the mask will be defined by setting the mask_start, mask_end, comp_mask and spec_mask signals.

In order to minimize the processor cycle time all of the dataflow controls (100) originate at the beginning of a cycle, at the e) cycle, as from latches. To accomplish this control signals are formed in the cycle before they are required (e.g. during em1) to be sent to the dataflow. In the case of the Register Array read address the control inputs to the mask generation process, this new virtual em1 stage incorporates the register read address selection 80 and the mask selection 90 processes which are a function of the instruction text of a potential incoming instruction.

Since there is not signal to confirm that the em1 stage contains a valid instruction, control speculation is used. At any instance in time the control signals feeding the dataflow (control for the mask and array read addresses in this case) are selected from among:

em1 controls (200) which are set during the em1 stage; the
e0 stage controls (210);
execution control (220) for the e1 cycle until the cycle before endop (end of operation); and
the hold control (230) where control lines are kept the same. The e-1 (em1) control 200 is selected when no other control stages are selected. The speculative control selection for em1 control complicates the control equations for other control signals since there can be no other "don't care" possibilities left available for logic reduction. As a result meeting the timing or frequency requirements for the em1 control is complex because it depends on the output of other units, but it is achievable.

Simplified equations that handles the speculative handshaking between I-Unit and FXU are:

Equations for the first level of muxing that handles part of the I-unit to E-unit handshaking of instructions.

```
nexti_sel <=
( (valid_e0_set1 or valid_e0_set2) and (not iu_eu_data_blocked) and (not iu_eu_excpt_pend)) or
(not iu_eu_nexti_ready);
nexti_hld <= (not nexti_sel)
where
valid_e0_set1:        fxu_rdy_4_any and fpu_rdy_4_any.
valid_e0_set2:        fxu_rdy_4_any and ovrlp_ex_set and fpu_rdy_4_ovlp.
fxu_rdy_4_any:        FXU is ready to accept new instruction into E0 stage from the I-unit.
fpu_rdy_4_any:        FPU (Floating Point Unit) is ready to accept new instruction into E0 stage
                      from the I-unit.
ovrlp_ex_set:         An I-Unit input indicating that I-unit is issuing an FPU instruction that can
                      be overlapped with other FPU instructions already in FPY pipe.
fpu_rdy_4_ovlp:       FPU is busy but can accept a new instruction that can be overlapped with
                      the current executing FPU instrcuctions.
iu_eu_data_blocked:   Data requested from cache is not ready yet. This signal is active in the
                      E1-cycle of an instruction and caused a freeze of the FXU/FPU pipes.
iu_eu_excpt_pend:     There is a possible exception associated with an instruction. This signal is
                      active in the E1-cycle of an instruction and caused a freeze of the
                      FXU/FPU pipes.
```

The confirmation for an E-1 instruction occurs a cycle later in E0 stage when signal nexti_sel is set. As long as there is no confirmation of a valid E-1 instruction, the EU keeps ingating a new instruction from the I-unit. As mentioned earlier, the mask generation and GPR read addresses for FXU instructions are selected from amonu em1 controls (200) e0 controls (210), execution controls (220) and hold controls (230). Therefore, there exist another level of muxing (other than nexti_sel, nexti_hld) that sets the mask and GPR read addresses.

The controls of 2nd level of muxing is less timing critical than the first level since most of the signals involved are instruction and FXU dependent. To make cycle time, the two muxes are combined together, but the em1 controls (200) is divided as follows:

```
sel_em1_next:    reg_sel_em1_part and nexti_sel
sel_em1_hold:    reg_sel_em1_part and nexti_hld
```

Where reg_sel_eml_part is the default selection for when e0 controls and hold controls are all clear. All control lines are verified to be orthogonal at any time. The final equation can be set as:

```
new_mask_value <=
    (e0_mask_value    when  e0 control are set        ) or    (210)
    (ex_mask_value    when  execution controls are set) or    (220)
    (old_mask_value   when  hold signals are are set  ) or    (230)
    (new_em1_mask     when  sel_em1_next is set       ) or    (200, new value)
    (em1_mask_hld     when  sel_em1_hld is set        );      (200, held value)
```

The creation of the E-1 pipeline stage also provides cycle time relief of the E0 stage by allowing an extra cycle to decode the instruction and form the GPR read addresses which need to be launched directly from latches at the beginning of the E0 cycle.

The E-1 stage of the mask generator logic overlaps with the I-unit instruction unit as well as with the execution cycles of older (earlier in the pipeline) instructions. It will be noted that the E-1 pipeline stage is implemented as a speculated pipeline stage. The validity of the E-1 stage is not known until the stage following, the E0 stage. This minimizes the impact to the I-Unit. If an E0 stage first becomes valid, it is implied that the E-1 stage was valid on the cycle before. This speculative handshaking allows the E-1 stage to be created with no impact to the last stage of the I-Unit, i.e. no additional logic is needed and cycle time is not jeopardized. Also, the E-1 stage of an instruction overlaps with the execution stages of previous instructions.

With this process, we can now implement in a computer system having an integer execution unit of the Central Processor (CP) which contains an Arithmetic and Logical Unit (ALU) which is capable of performing arithmetic functions including binary addition, subtraction, and logical operations such as logical and, logical or, and logical exclusive or. The logical operations are bit maskable to select which bits of the operands participate in the logical operation. With this system we proceed with the method for allowing a partial instruction to be executing during the instruction dispatch cycle of the computer system. This method makes use of the FXU pipeline stage created to accommodate the first part of the mask generate process. This E-1 stage is inserted before the E0 stage. The addition of this pipeline stage did not increase the depth of the FXU pipeline. This E-1 stage overlaps with the last stage or dispatch stage of the Instruction Decode and Dispatch Unit, I-Unit.

The method proceeds by dividing a timing critical function (e.g. a mask generation process or read addresses for the GPRs) used for execution of an instruction into first and second partitioned processes partitioned among a first and a second pipeline stage of a single pipeline.

The first partitioned process has a predetermination cycle (em1) which initiates two cycles before a first cycle of execution of said instruction when the input operands feed the ALU and the result is put into a result register and which initiates the timing critical function for execution of an instruction to be executed.

The second partitioned process has a first cycle (e0) and a second cycle (e1) and a third cycle (PA) and the first cycle (e0) is initiated when an instruction is being decoded to determine what instruction it is in order to setup the controls to the computer system ALU and the second partitioned process is used for reading and loading operands into the computer system's FXU input registers which cycle determines whether the timing critical function of said predetermined cycle is valid for an instruction to be executed, and the second cycle (e1) performs the first cycle of execution of said instruction where the input operands feed the ALU and the result is put into a result register, and during the third cycle (PA) the contents of the result register are sent to the architected General Purpose Register file (GPR).

In the process allowing a partial instruction to be executing during the instruction dispatch cycle of the computer system, the three pipeline cycles of the second partitioned process said pipeline stages work independently so that they contain three different instructions in various states of execution. The first partitioned process overlaps with the I-unit instruction pipeline as well as with the execution cycles of earlier in the pipeline instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for use in a computer system having an integer execution unit (FXU) having an Instruction Decode and Dispatch Unit (I-Unit) of a central processor (CP) of the computer system and in which said integer execution unit contains an arithmetic and logical unit (ALU) which is capable of performing arithmetic functions including binary addition, subtraction, and logical operations such as logical and, logical or, and logical exclusive or, wherein said logical operations for operands which feed the ALU are bit maskable to select which bits of the operands participate in the logical operation, comprising the steps of:

allowing a partial instruction to be executing during the instruction dispatch cycle of the computer system by providing said integer execution unit (FXU) with a predetermination cycle pipeline stage created to accommodate a timing critical function used for execution of an instruction, and overlapping said predetermination cycle pipeline stage (E-1 stage) with a dispatch cycle of the Instruction Decode and Dispatch Unit (I-Unit) of said integer execution unit (FXU) of a central processor (CP) of the computer system before an instruction is dispatched.

2. The method according to claim 1 wherein a timing critical function used for execution of an instruction is divided, into first and second partitioned processes partitioned among a virtual first and a second pipeline stage of a single pipeline, said first pipeline stage being said predetermination cycle pipeline stage and a virtual stage. and said second pipeline stage being one where a prior instruction received has been confirmed as valid.

3. The method according to claim 2 wherein said first partitioned process has said predetermination cycle (em1) which initiates two cycle before a first cycle of execution of said instruction when the operands feed the ALU and the result of calculations performed in the ALU is put into a result register and which initiates the timing critical function for execution of an instruction to be executed.

4. The method according to claim 3, wherein
said second partitioned process, which includes said dispatch cycle, has a first predetermination cycle (e0) and a second cycle (e1) and a third cycle (PA).

5. The method according to claim 4 wherein said first predetermination cycle (e0) is initiated when an instruction is being decoded to determine what instruction it is in order to setup the controls to the computer system ALU and the second partitioned process is used for reading and loading operand into a plurality of FXU input registers of said computer system's FXU which second cycle determines whether the timing critical function of said predetermination cycle is valid for an instruction to be executed, and the second cycle (e1) performs the first cycle of execution of said instruction where the input operands feed the ALU and the result is put into a result register,
and wherein during the third cycle (PA) the contents of the result register are sent to an architected General Purpose Register file (GPR).

6. The method according to claim 5 wherein said third cycle is a dispatch cycle during which the contents of the result register are sent to an architected General Purpose Register file (GPR).

7. The method according to claim 5 wherein said timing critical function is a mask generation process.

8. The method according to claim 5 wherein said timing critical function determines read addresses for the GPRs of said computer system.

9. The method according to claim 5 wherein in the process allowing a partial instruction to be executing during the instruction dispatch cycle of the computer system, the three pipeline cycles of the second partitioned process used for reading and loading operands into a plurality of FXU input register in said pipeline stages work independently so that they contain three different instructions in various states of execution.

10. The method according to claim 5 wherein the first partitioned process overlaps with the Instruction Decode and Dispatch Unit (I-unit) instruction pipeline as well as with the execution cycles of earlier in the pipeline instructions.

11. The method according to claim 5 wherein said predetermination cycle pipeline stage is used to accommodate a first part of the mask generation process, and this predetermination cycle pipeline stage (E-1 stage) is inserted before a pipeline execution stage (E0 stage).

12. The method according claim 11, wherein said predetermination cycle pipeline stage does not increase the depth of the FXU pipeline and overlaps with the last stage or dispatch stage of the Instruction Decode and Dispatch Unit (I-Unit).

13. The method according to claim 1 wherein said predetermination cycle pipeline stage also provides cycle time relief of the first predetermination cycle (e0) execution stage by allowing an extra cycle to decode the instruction and form GPB read addresses which need to be launched directly from latches at the beginning of the first predetermination cycle (e0).

14. The method according to claim 1 wherein said predetermination cycle pipeline stage is a stage of the mask generation logic which overlaps with the Instruction Decode and Dispatch Unit (I-unit) as well as with the execution cycles of older (earlier in the pipeline) instruction.

15. The method according to claim 1 wherein said predetermined cycle pipeline stage is implemented as a speculated pipeline stage in which the validity of said predetermined cycle pipeline stage is not known until a following execution stage, wherein if an execution (E0) stage first becomes valid, the predetermined cycle pipeline (E-1 stage is considered valid on the cycle before, without impacting a subsequent dispatch stage of said I-Unit.

* * * * *